UNITED STATES PATENT OFFICE.

PERCY R. MIDDLETON, OF LOS ANGELES, CALIFORNIA, ASSIGNOR OF ONE-HALF TO JOHN C. LALOR, OF NEW YORK, N. Y.

PROCESS OF ELECTROLYSIS OF COPPER-BEARING SOLUTIONS.

1,397,647.   Specification of Letters Patent.   Patented Nov. 22, 1921.

No Drawing.   Application filed February 16, 1920. Serial No. 359,110.

*To all whom it may concern:*

Be it known that I, PERCY R. MIDDLETON, a subject of the King of Great Britain, residing at Los Angeles, in the county of Los Angeles and State of California, have invented new and useful Improvements in Processes of Electrolysis of Copper-Bearing Solutions, of which the following is a specification.

This invention relates to the electrolysis of copper bearing solutions containing also other metals such as zinc or iron for the recovery of metals therefrom and refers more especially to the electrolysis of solution obtained by the leaching of ores and metallurgical products with sulfuric acid preferably spent electrolyte produced by previous electrolysis.

When scrap iron is used for the precipitation of copper from solution resulting from the leaching of ores and metallurgical products, the cement copper produced is of inferior quality and the consumption of iron is from 1.5 to twice the theoretical quantity required and the barren solution from this method of precipitation has to be discarded on account of the large quantity of iron in solution so that any acid values in the solution are lost.

In the electrolysis of copper bearing solutions it has not been found commercially possible to reduce the copper contents of the electrolyte below a certain point, that is 8 grams of copper per liter and in general practice this copper is recovered by passing the spent electrolyte over scrap iron from which it is subsequently recovered in the form of sludge.

In the treatment of copper bearing solutions containing other metals such as zinc or iron, obtained by the leaching of an oxidized or roasted ore, the copper may be precipitated by electrolysis down to about 8 grams of copper per liter but if this solution is then subjected to further electrolysis for the deposition of the zinc, it is essential that all of the copper must first be removed. The usual practice in zinc electrolysis is to effect the recovery of the copper by zinc dust precipitation but this is usually effected in a neutral or approximately neutral solution. The recovery of the copper by zinc dust precipitation is consequently not practicable with spent electrolyte arising from the electrodeposition of copper on account of the acidity of the solution, while further deposition on scrap iron cannot be employed owing to the large quantity of iron which would go into solution which would have to be removed prior to electrodeposition of the zinc.

The object of this invention is to provide means of treatment of copper bearing solutions containing also zinc or iron resulting from the leaching of ores or metallurgical products whereby the copper may be recovered without excessive consumption of iron or acid and the spent solution used again for the leaching of a fresh batch of ore or calcines; and also to provide means of recovering the residual copper in spent electrolyte after copper electrolysis, and a zinc bearing solution obtained free from copper which is suitable for electrodeposition of zinc.

My invention consists of the steps of the process hereinafter described and claimed.

I accomplish this object by causing the proper bearing solution, (either solution from the leaching of ore or calcines or spent electrolyte after ordinary copper electrolysis) to circulate through cells embodying the principle of the Daniel cell, that is to say in which one electrode is copper and the other zinc or iron as the case may be, with a porous pot or diaphragm between. The solution to be treated, which may be either neutral or acid, is circulated through that part of the cells containing the copper electrode while in the other part of the cell, when the electrode is zinc zinc sulfate is circulated and if the electrode is iron either ferrous or ferric sulfate (or a mixture of both) would be employed.

These copper and zinc or iron electrodes are connected and a current is thereby produced which is maintained until the copper contained in solution circulating through the part of the cell containing the copper electrode is deposited and a spent electrolyte obtained relatively free from copper. It may be desirable to use an electric current from an outside source in order to hasten the deposit of copper on the cathode. When the process is employed for the precipitation of copper without previous copper electrolysis and the spent electrolyte is to be used for the leaching of a fresh charge of ore or calcines, it will not be necessary to deplete the copper solution until such time as impurities have accumulated in the cycle. The copper precipitated in the cell is found to be much superior to that precipitated on scrap iron in the usual way and is in a condition suitable for the production of a high grade metallic copper.

Several different types of cells may be used but the type which I prefer to employ is that using a diaphragm between the two electrodes, this diaphragm may be either vertical or horizontal and a number of cells may be employed. The copper bearing solution being fed to the first of the series and passing from one cell to another being discharged at the last cell practically free from copper, at the same time the iron sulfate solution or zinc sulfate solution as the case may be would also be circulated to prevent it becoming saturated. By this method of operation there is no excessive consumption of iron or zinc, approximately the theoretical amount going into solution and when zinc electrodes are employed the metal may be recovered in the subsequent electrodeposition of zinc.

What is claimed is:

1. Process of treating metallurgical solutions containing a copper salt and a salt of a metal electropositive to copper, comprising passing an electric current through such solution while circulating the same through the cathode compartment of an electrolytic cell provided with a diaphragm and with an anode of the electropositive metal of which the salt is present in the copper-bearing solution, thereby depositing copper from the solution.

2. Process according to claim 1, in which the copper-free solution is thereafter treated to recover the electropositive metal therefrom.

3. Process of treating metallurgical solutions containing copper and zinc salts, comprising passing an electric current through such solution while circulating the same through the cathode compartment of an electrolytic cell provided with a diaphragm and with an anode of zinc, thereby depositing copper from the solution, and thereafter electrolyzing the copper-free solution to deposit the zinc therefrom.

In testimony whereof I have signed my name to this specification.

PERCY R. MIDDLETON.

Correction in Letters Patent No. 1,397,647.

It is hereby certified that in Letters Patent No. 1,397,647, granted November 22, 1921, upon the application of Percy R. Middleton, of Los Angeles, California, for an improvement in "Processes of Electrolysis of Copper-Bearing Solutions," an error appears in the printed specification requiring correction as follows: Page 1, line 78, for the word "proper" read *copper;* and that the said Letters Patent should be read with this correction therein that the same may conform to the record of the case in the Patent Office.

Signed and sealed this 3d day of January, A. D., 1922.

[SEAL.]
WM. A. KINNAN,
*Acting Commissioner of Patents.*